United States Patent
Tsuchiya

[11] 3,914,854
[45] Oct. 28, 1975

[54] METHOD FOR SECURING AN ABRASIVE WHEEL TOOL TO A SPINDLE OF A WHEEL HEAD

[75] Inventor: Takanori Tsuchiya, Hiroshima, Japan

[73] Assignee: Toyo Kogyo Co., Ltd., Hiroshima, Japan

[22] Filed: Dec. 20, 1973

[21] Appl. No.: 426,738

Related U.S. Application Data

[63] Continuation-in-part of Ser. No. 192,461, Oct. 26, 1971.

[30] Foreign Application Priority Data

| Oct. 26, 1970 | Japan | 45-94112 |
| Oct. 26, 1970 | Japan | 45-94113 |
| Oct. 26, 1970 | Japan | 45-94114 |
| Oct. 26, 1970 | Japan | 45-106205[U] |
| Oct. 26, 1970 | Japan | 45-106206[U] |

[52] U.S. Cl. ............... 29/568; 51/168; 403/282; 403/359; 403/365
[51] Int. Cl.² ........................................ B23Q 3/157
[58] Field of Search ........ 29/568; 51/168, 206 R, 51/207; 403/282, 365, 359

[56] References Cited
UNITED STATES PATENTS

| 872,932 | 12/1907 | Hall | 51/168 |
| 2,519,035 | 8/1950 | Esty | 51/168 |
| 2,804,727 | 9/1957 | Schmidt | 51/168 X |
| 3,217,406 | 11/1965 | Dever | 29/568 |
| 3,627,490 | 12/1971 | Asano | 51/168 X |

*Primary Examiner*—Donald R. Schran
*Assistant Examiner*—Z. R. Bilinsky
*Attorney, Agent, or Firm*—Sughrue, Rothwell, Mion, Zinn & Macpeak

[57] ABSTRACT

This invention relates to a method for press-fitting an abrasive wheel tool having a cylindrical tubular bushing made of a light metal and bonded to the inner surface of a bore of a cylindrical tubular abrasive wheel onto a spindle of a wheel head so as to make the burnishing connection between them, thereby improving the securing accuracy of the abrasive wheel tool. The abrasive wheel tool is exchangable merely by drawing it after it is wore up, because of the fact that the automatic exchanging operation of the abrasive wheel tool is easily achieved.

15 Claims, 28 Drawing Figures

FIG. 1
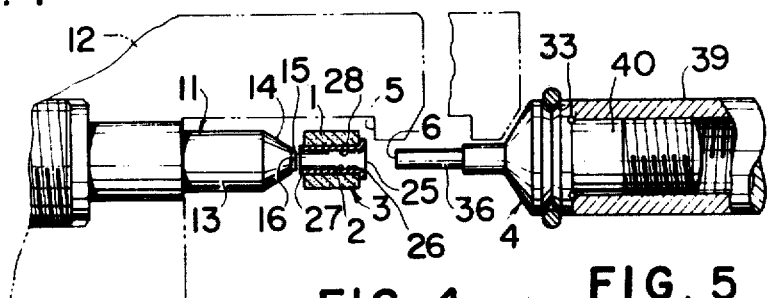
FIG. 2  FIG. 3  FIG. 4  FIG. 5
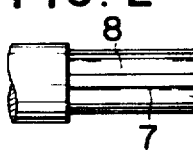 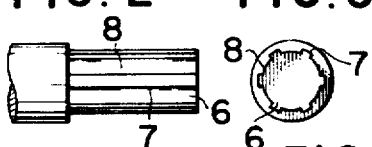 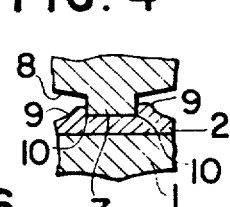 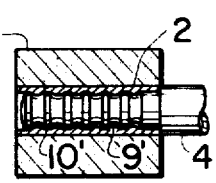
FIG. 6
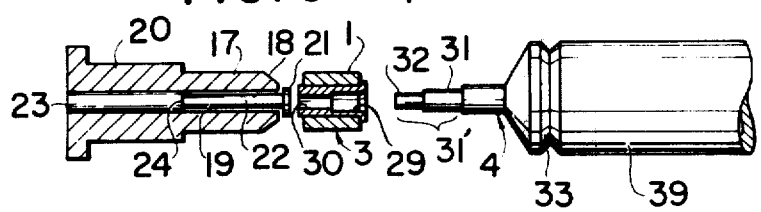
FIG. 7  FIG. 8
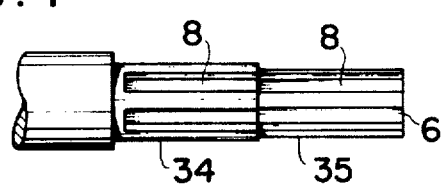 
FIG. 9
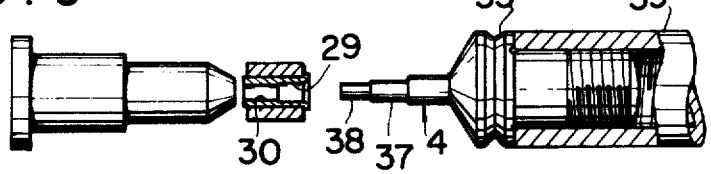
FIG. 10
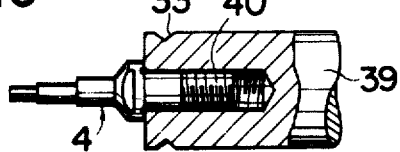

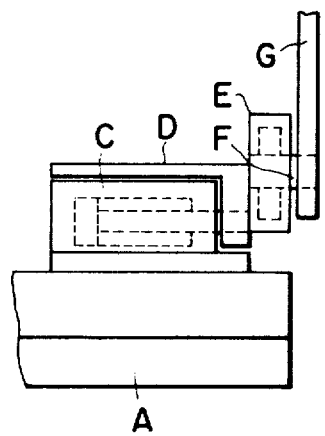
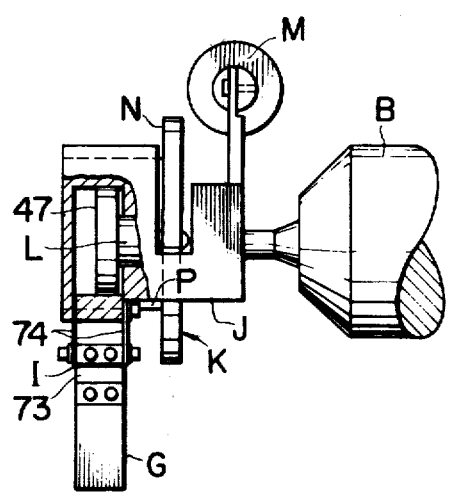
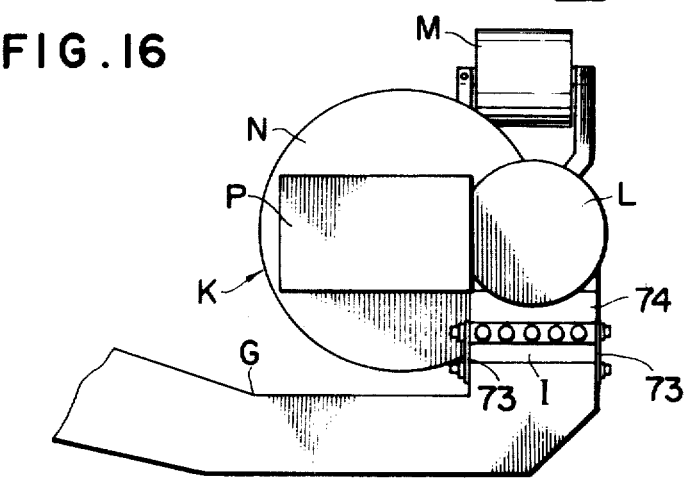
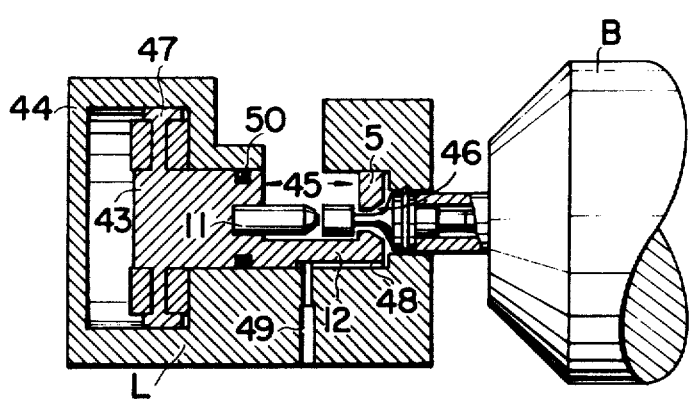

METHOD FOR SECURING AN ABRASIVE WHEEL TOOL TO A SPINDLE OF A WHEEL HEAD

The present invention is a continuation-in-part application of parent applications Ser. No. 192,461 filed on Oct. 26, 1971.

BACKGROUND OF THE INVENTION

1. Field of the Invention

The present invention relates to a method for press-fitting an abrasive wheel tool having a cylindrical tubular bushing bonded to the inner surface of a bore of a cylindrical tubular abrasive wheel onto a spindle of a wheel head having a cutting edge at its tip portion so as to make the burnishing connection between them while machining the inner peripheral surface of the bushing.

2. Description of the Prior Art

Heretofore, an A. W. T., particularly an A. W. T. having a diameter less than 15 mm, generally used in an internal grinder has been so constructed that it is bonded to one end of a cylindrical rod-like arbor made of mild steel so as to be made integral therewith, the other end portion of the arbor having a length sufficient to be mounted in the spindle of the wheel head of the grinder. That is, the arbor is inserted in the bore of the spindle coaxial therewith and fixedly secured by one or two set screws threaded into the spindle in the direction perpendicular to the axis of the spindle.

In such a prior art A. W. T., the outer diameter of the arbor is necessarily made smaller than the inner diameter of the bore of the spindle of the wheel head by a small amount such as 5 – 10$\mu$, thereby causing the eccentricity between the arbor and the spindle which results in the deterioration of the machining accuracy as well as the vibration of the spindle.

The balancing of the A. W. T. is also deteriorated by the amount of threading of the set screws for securing the arbor to the spindle, thus resulting in the vibration of the spindle of the wheel head.

On the other hand, when a bore of small diameter such as less than 10 mm is to be ground in an internal grinder, the allowable amount of wear in the abrasive wheel is necessarily limited to a predetermined value, because the peripheral speed of the abrasive wheel is reduced as the outer diameter of the abrasive wheel becomes small.

For example, when an abrasive wheel having an outer diameter of 6 mm is used and the grinding operation is commenced at the peripheral speed of 2,000 m/min., the peripheral speed will be made 1,670 m/min. when the abrasive wheel is worn by about 20%, i.e., the outer diameter is reduced to 5 mm. Thus, it is no longer possible to carry out efficient grinding operation. Assuming that the amount of wear of the abrasive wheel in one working cycle including the dressing operation is 10 Mu and the time of one cycle is 6 sec., the maximum workable cycles are 100 times, if the lower limit of the outer diameter of the used abrasive wheel is 5mm. In other words, the A. W. T. will have to be changed in every 10 min.

In an A. W. T. having a relatively low limit of wear, i.e., an A. W. T. having the outer diameter smaller than 15 mm, frequency of exchange of the A. W. T. is made high, and, since it takes a certain time for effecting the exchange of the A. W. T., idle time is made long, thereby making the grinding operation very inefficient. In the A. W. T. having the outer diameter larger than 15 mm, two kinds of the A. W. T., one of them having a cylindrical tubular bushing made of mild metal and the other without having such bushing, are generally used. In these A. W. T. S., the securing of them onto the wheel head of the spindle is made by means of bolt-nut after these A. W. T. S are mounted on the spindle. Therefore, as the inner diameter of the bore of these A. W. T. S or bushings thereof is slightly larger than the outer diameter of the spindle, the discrepancy is caused between the axis of the grinder and the centre of the axis of the A. W. T., resulting in disadvantages such as the deterioration of securing accuracy, the vibration of the spindle.

As described above, since the attachment of the prior art A. W. T. has been effected by means of set screws or bolt-nut, the exchange of the A. W. T. has been made manually.

The attempt to fully automatize the exchange of A. W. T. by using the prior art attaching device having set screws or bolt-nut is almost impossible, because the attaching and detaching mechanism as well as the changing operation is made very complicated. Therefore, it is necessary for an operator to always watch and wait for the exchange of the A. W. T.

Further, as described previously, problems arise in the accuracy of the attachment of the A. W. T. after the exchange thereof, so that the different eccentricity of the A. W. T. will be caused each time it is changed thus causing the vibration of the spindle and affecting the grinding operation.

The demand for the solution of the problems relating to the accuracy described above and the necessity for the fully automatized exchange of the A. W. T. have been increased in view of the tendency of economization due to the labor shortage.

SUMMARY OF THE INVENTION

An object of the present invention is to provide a novel and useful method for securing an abrasive wheel tool (A. W. T.) to a spindle which eliminates the above described disadvantages of the prior art, improves the balancing accuracy of the attachment of the A. W. T. to the spindle of the wheel head of an internal grinding machine, and simplifies the changing operation of the A. W. T. by adopting the press-fitting of the A. W. T. with the spindle.

Another object is to provide a novel and useful A. W. T. of the type described above which is provided with a cylindrical tubular bushing made of a material such as a light metal or a plastic and secured to the bore of the cylindrical tubular abrasive wheel for permitting the rapid exchanging of the A. W. T.

A futher object of the present invention is to provide a novel and useful spindle in the wheel head of a grinding machine which improves the balancing accuracy of the A. W. T. attached thereto and which is suitable to press-fit the A. W. T. for simplifying the exchanging operation of the A. W. T.

Another object is to provide a novel and useful internal grinding machine in which the exchanging operation of the A. W. T. is fully automatized.

A further object of the present invention is to provide a novel and useful internal grinding machine in which the A. W. T. is attached to the spindle of the wheel head of the grinding machine by a burnishing connection which is particularly suitable for the automatic changing of the A. W. T.

BRIEF DESCRIPTION OF THE DRAWINGS

FIG. 1 is a fragmentary longitudimal sectional view showing as a general embodiment the relative positions of the connecting bushing of the abrasive wheel and the cylindrical spindle together with a conventional press pin for urging the bushing onto the spindle.

FIG. 2 is an enlarged side view showing the spindle formed with longitudinal spline grooves is its peripheral surface.

FIG. 3 is an enlarged front view of the spindle of FIG. 2.

FIG. 4 is an enlarged, fragmentary, cross-sectional view showing the formation of the encroaching portions of the bushing of the A. W. T. at the edges of the spline grooves of the spindle.

FIG. 5 is an enlarged side view partly in section showing the connection of a spindle having annular grooves in the form of a broach in its peripheral surface to the internal surface of the bushing of the A. W. T.

FIG. 6 is a view similar to FIG. 1 but showing the bushing having internal surfaces of larger and smaller diameter and the spindle having the corresponding configuration to the internal surfaces of the bushing together with a headed press pin.

FIG. 7 is an enlarged side view showing the spindle having a small diameter portion and a large diameter portion with spline-shaped longitudinal grooves being formed in the respective portions.

FIG. 8 is an enlarged front view of the spindle of FIG. 7.

FIG. 9 is a view similar to FIG. 6 but showing the conventional press pin used in place of the headed press pin of FIG. 6.

FIG. 10 is a fragmentary side view, partly in section, showing a main shaft of a wheel head provided with clamping grooves directly formed therein to which the cylindrical spindle having two connecting surfaces of larger and smaller diameter is threadedly engaged.

FIG. 14 is a side view of the portion shown in FIG. 13 with a part omitted for the clear showing.

FIG. 15 is a side view showing the automatic abrasive wheel changing device of the present invention with the spindle of the wheel head being clamped thereby.

FIG. 16 is a front view showing the automatic abrasive wheel exchanging device.

FIG. 17 is a side view partly in section showing an embodiment of the abrasive wheel tool push-pull mechanism.

DETAILED DESCRIPTION OF THE PREFERRED EMBODIMENT

Figure 11:
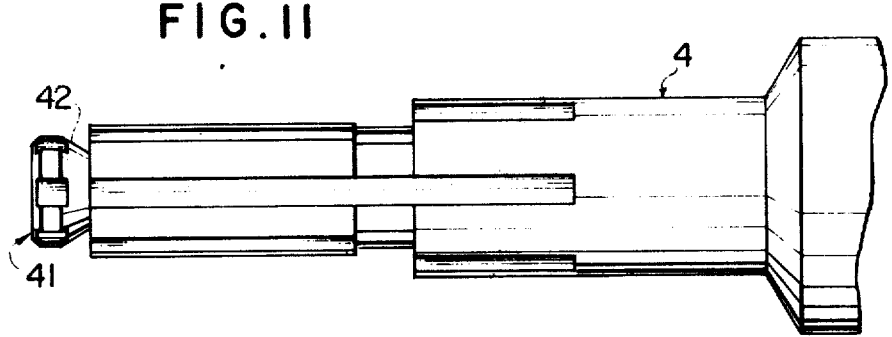
FIG. 11 is an enlarged side view showing the cylindrical spindle provided with guide means at the tip thereof for permitting the axis of the spindle to coincide with that of A. W. T.

The general construction of the present invention will be described below with reference to FIG. 1.

The abrasive wheel tool (A. W. T.) 3 having a cylindrical tubular bushing 2 bonded to the inner surface of the bore of the cylindrical tubular abrasive wheel 1 is press-fitted onto the cylindrical spindle 4 in the wheel head of the grinder by means of a piston rod driven forwardly by the oil pressure. The inner peripheral surface of the bushing 2 and the outer peripheral surface of the spindle 4 are securely fixed by the burnishing connection.

The A. W. T. 3 is withdrawn by a latching portion 5 provided in the piston rod which is retracted for withdrawing the A. W. T. in the manner as described above, the present invention makes it possible to easily exchange A. W. T. 3 fully automatically and quickly, which A. W. T. is required to be exchanged very frequently due to its small diameter.

In order to permit the securing of A. W. T. 3 press-fitted with the spindle 4 by the burnishing connection and to protect the cylindrical abrasive wheel 1, the following points must be taken into consideration in preparing the cylindrical tubular bushing 2.

The thickness of the bushing 2 must result in the outer diameter being sufficient to allow wear of the abrasive wheel 1 in the operation, while the inner diameter must be selected so as to be sufficient to maintain the rigidty of the spindle 4 to be fitted with the bushing 2. For example, when the outer diameter of the A. W. T. 3 is in the order of 6 mm and the inner diameter thereof is in the order of 3 mm, the thickness of the bushing 2 is preferred to be made in the order of 0.5 mm and the material for forming the bushing 2 must be relatively soft metal or a plastic and the like in order to insure the long life of the spindle 4 with which the bush 2 is press-fitted. For example, when a metal is used, it is preferred to employ a metal having a low machinability in order to obtain a high frictional force between the mating surfaces of the bushing 2 and the spindle 4.

The interference to be provided when the bushing 2 of the A. W. T. 3 constructed in the manner described above is press-fitted on the spindle 4 is subjected to the following three limitations:

1. The interference may not be too large because it is required to prevent the A. W. T. from being destroyed or expanded excessively by the press-fitting operation.

2. The amount of the interference of the press-fitting operation can not be made great, because it is preferred to make the hydraulic device for attaching and detaching the A. W. T. as compact as possible so that the size of the oil cylinder is the minimum and the oil pressure is relatively low.

3. On the other hand, the amount of the intereference of the press-fitting maynot be made too small, because the strength of securing of A. W. T. 3 to the spindle 4 must bear the grinding operation of the A. W. T.

In order to satisfy the above three conditions, the following two kinds of cutting conditions may be adopted. The first of the two conditions is adapted for the heavy load grinding operation and the amount of the inteference of the press-fitting is selected to be as large as possible within the range allowable by the strength of the bushing 2. For example, when the bushing 2 is made of aluminum, the region of cutting, i. e., the interference, is made 0.04 to 0.1 mm in the radius. The peripheral edge 6 or the tip of the spindle 4 is made a cutting edge. Further, as shown in FIGS. 2 and 3, the mating surface 7 of the spindle 4 is provided with several number of spline-shaped grooves 8 in the axial direction of the spindle 4. Therefore, the cross-sectional area of the cutting is made small so that the cutting resistance decreases thereby reducing the force for the press-fitting. At the same time, as shown in FIG. 4 in which the cross-section of the securing of the bushing 2 to the spindle 4 is illustrated, the encroaching portions 10 of the spindle 4 into the raised portions 9 formed in the inner surface of the bushing 2 greatly resist against the severe grinding torque.

Alternatively, as shown in FIG. 5, the spindle 4 may be provided with a plurality of annular grooves in the form of a broach perpendicular to the axis of the spindle 4 with which the bushing 2 is press-fitted thereby insuring rigid connection of the bushing 2 to the spindle 4. In this case, the connection can sufficiently resist against the grinding torque because the raised portions 9' of the bush 2 firmly clamp the edge portions 10' of the broach-like grooves of the spindle 4.

The second of the above two conditions is adapted to be used with a cylindrical spindle as shown in FIG. 1 which is suitable for the normal load of grinding operation. The interference, i. e., the amount of press-fitting, is selected to be as large as possible in the range allowing the capacity of the hydraulic device for the press-fitting, that is, in case aluminum bushing 2 is used, for example, the interference is made 0.005 to 0.01 mm in the radius within the area of burnishing. The cross-sectional area of cutting by the cutting edge 6 at the tip of the spindle 4 is made as small as possible so that the force for the cutting is reduced and still provides the mating surfaces having high frictional force capable of resisting normal grinding torque.

The amount of expansion of the cylinder, i. e., bushing, subjected to the internal pressure is calculated by the following formula:

$$U = [4pr^2 (r + t)]/[Et (2r + t)]$$

where:
$U$ = amount of radial expansion of the outer diameter
$P$ = internal pressure
$t$ = thickness of the bushing
$E$ = Young's modulus of the material
$r$ = inner radius of the bushing Therefore, the amount of expansion of the outer diameter of the bushing will be made smaller as the inner diameter thereof is made smaller if the thickness of the bushing is kept the same. The feature is utilized in the exchange of the abrasive wheel tool of small diameter when the cylindrical spindle is used. In the mating surfaces connected by the burnishing connection to each other, theh differences among the resistive force against the sliding, the force required for press-fitting the bush with the spindle and the force normal to the mating surfaces, i. e., the internal pressure applied to the bush are small, but the frictional coefficient will be made larger than that occurring in the abrasive wheel using the splined spindle. This feature is also utilized in the abrasive wheel tool of small diameter using the cylindrical spindle.

The press pin 11 for urging the A. W. T. when the same is to be press-fitted with the spindle is threadedly engaged with the piston rod of an oil actuated hydraulic cylinder. In the embodiment shown in FIG. 1, the press pin 11 comprises a barrel 13 having a diameter slightly larger than that of the outer diameter of the abrasive wheel 3, a tapered portion 14, a pressing face 15 for urging the abrasive wheel 3 onto the spindle 4, and a projecting portion 16 adapted to be inserted into the inner diameter of the abrasive wheel tool 3 so as to effect the centering of the same with respect to the spindle. The barrel 13 is used to keep the abrasive wheel clamping leaf portions of the abrasive wheel supply magazine in opened state for receiving the used adrasive wheel tool 3 which is withdrawn from the spindle after the same has been supplied from the magazine to the spindle 4. The tapered portion 14 is adapted to facilitate press pin 11 to be easily advanced in the clamping leaf portions.

An alternative form of the press pin 11 is illustrated in FIG. 6. The press pin 11 shown in FIG. 6 comprises a barrel 17, a tapered portion 18, a press pin body 20 having a nail inserting bore 19 and a nail 24 press-fitted in the bore 19 and having a pressing face 21, a reduced diameter portion 22, and an enlarged diameter portion 23 for transmitting the pressing force.

In further describing the construction of the bushing 2 bonded to the inner diameter portion of the abrasive wheel 1 for providing the mating surface press-fitted with the spindle with reference to FIG. 1, the bushing 2 is provided at its entrance end with a flange 25 forming the latching portion for insuring the withdrawal of the bushing 2 after used up, a tapered portion 26 for guiding and centering the bushing 2 when the same is press-fitted with the spindle 4, and a projecting portion 27 slightly projecting from the end surface of the abrasive wheel 1 for insuring the pushing action of the pressing face 15 at the tip of the press pin 11 when press-fitting of the bushing 2 is effected, the inner diameter portion having a single mating surface 28 for being press-fitted with the spindle 4. If necessary, the mating surface 28 may be formed with a slight taper with the diameter at the side of the press pin 11 having smaller diameter.

In the embodiment shown in FIG. 6, the mating surface of the bushing 2 is divided into two portions, the inner diameter portion 29 of one of the portions adjacent to the spindle 4 having an interference, i. e., an amount of cutting area in the press-fitting, so that the inner diameter portion 29 is made greater than the inner diameter 30 of the other portion at the side near the press pin, the outer diameter 31 of the spindle being correspondingly enlarged than the outer diameter 32 of the spindle which is made substantially the same size as the inner diameter 29 of the bushing at the side adjacent to the spindle. In the before half period of the press-fitting of the bushing, the inner diameter portion 29 is centered with respect to the outer diameter portion 32 of the spindle, and, in the later half period of the press-fitting, the inner diameter portion 30 of the bushing is press-fitted with the outer diameter portion 32 while the inner diameter portion 29 is press-fitted with the outer diameter portion 31 of the spindle.

The spindle 4 is provided with an annular encroaching groove 33 used to clamp the attaching and detaching mechanism of the bush directly to the spindle 4 so that no thrust pressure is given to the wheel head when the A. W. T. 3 is attached to or detached from the spindle 4. The cutting edge 6 at the tip of the spindle 4 is formed with several members of grooves 8 described previously as shown in FIGS. 2 and 3, so that the cutting edge 6 effects the cutting in the region of the cutting other than the grooves 8 during the press-fitting operation.

Alternatively, as shown is FIGS. 7, 8, the cutting edges 6 are formed in the end surface of the reduced diameter portion 35 of the spindle and the end surface of the enlarged diameter portion 34 of the spindle, respectively, the reduced and enlarged diameter portions having spline-shaped grooves 8 similar to those shown in FIGS. 1 and 2. The embodiment shown in FIGS. 7, 8 has in like manner as shown in FIG. 6 the larger outer diameter portion 34 having an interference, so that it is made greater than the smaller outer diameter portion 35 by the interference, the smaller diameter portion 35 being made substantially the same as the larger inner diameter portion of the bushing. Thus, in the before half period of the press-fitting, the centering is effected while, in the later half period, the press-fitting is effected in either of the smaller diameter portion and the larger diameter portion of the spindle. The cutting edge 6 at the end surface of the smaller diameter portion of the spindle may be dispensed with while the cutting edge of the larger diameter portion is left. In this case, the end edge of the smaller diameter portion of the spindle is formed with a guide surface for facilitating the insertion of the bushing.

An alternative form of the cutting edge 6 shown in FIG. 1 is so constructed that the spindle is in the form of a cylinder and the outer diameter 36 of the cutting edge 6 is made greater than the inner diameter of the bushing by the amount of burnishing press-fitting, the press-fitting being effected by the interference provided for the burnishing connection.

Another embodiment of the cutting edge 6 shown in FIG. 9 is so constructed that the spindle is formed by a smaller diameter portion 38 and a larger diameter portion 37, the latter being made greater than the former by the amount of the interference in the press-fitting in like manner as shown in FIG. 6, so that the centering is effected in the before half period of the press-fitting while, in the later half period, the press-fitting is effected by the interference provided for the burnishing.

The construction for connecting the abrasive wheel spindle 4 to the main shaft 39 of the wheel head may be that as shown in FIG. 1 in which the spindle 4 is connected to the main shaft 39 by the straight quill mechanism 40 or alternatively, as shown in FIG. 10, the spindle 4 having no groove 33 is connected to the main shaft 39 formed with the above mentioned encroaching groove 33 by the straight quill mechanism 40, or, as shown in FIG. 6, the tip of the main shaft 39 per se forms the spindle 4.

As shown in FIG. 11, a guide 41 may be preferably formed at the tip of the spindle 4 in order to prevent the eccentric press-fitting of the spindle 4 which might occur depending upon the condition of the press-fitting. The outer diameter of the guide 41 is made slightly smaller than the portion of the spindle where it is secured to the bushing by the burnishing connection, so that the A. W. T. is smoothly fitted with the spindle with the axis of the A. W. T. held in alignment with that of the spindle, grooves 42 are preferably formed in the spindle for receiving the cutting chips generated by the cutting of the bushing by the cutting edge of the spindle.

Figure 12:
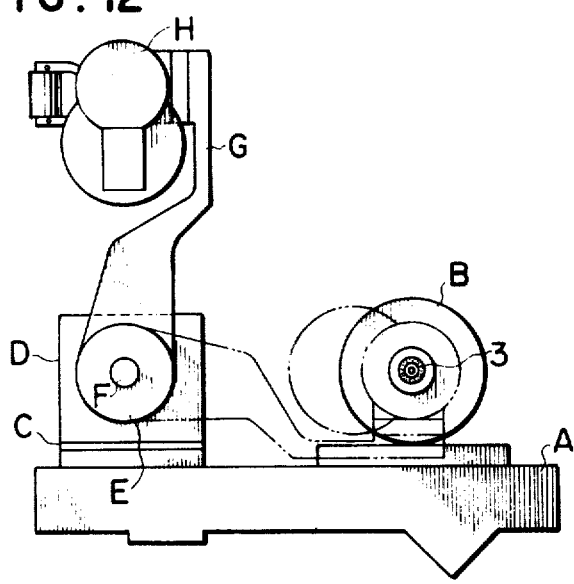
FIG. 12 is a front view showing the essential portion of an embodiment of an abrasive wheel changing device of the present invention.
Figure 13:
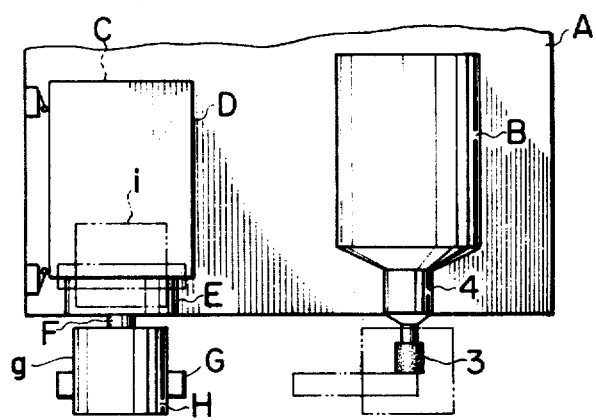
FIG. 13 is a plan view of the essential portion shown in FIG. 12.

An embodiment of the abrasive wheel changing device of an internal grinder constructed in accordance with the present invention will be described below. As shown in FIGS. 12 to 14, the device comprises a wheel head B located on the table A, indexing device C provided with a movable portion D by the oil actuated hydraulic device for indexing the linear positon in the forward and rearward direction, the movable portion D being movable in parallel to the movement of the wheel head B, a rotational angle indexing device E mounted on the movable portion D, a rotatable shaft F which is indexed for the proper angular position thereof by means of the indexing device E a swingable arm G attached to the swingable shaft F, and an automatic abrasive wheel tool exchanging device H secured to the tip of the arm G.

In the device shown, a limit switch provided in the feeding device of the grinder is actuated in the conventional manner when the A. W. T. is used up, to reach the lower limit of the outer diameter so that the table A is automatically retracted from its working position to the position for changing the A. W. T. and the wheel head B is held stationary. By a signal generated when the wheel head B is held stationary the automatic abrasive wheel tool exchanging operation is commenced. Thus, the automatic abrasive wheel tool exchanging device H is advanced from the initial rest position i to a position g corresponding to the position of the retracted wheel head B by means of the linear position indexing device C for commencing the rotational angle indexing operation. The exchanging device H is then swung down to a position in front of the wheel head B by the actuation of the rotational angle indexing device E, so that the spindle 4 is clamped thereby.

As shown in FIGS. 15, 16, the automatic abrasive wheel exchanging device H comprises an abrasive wheel attaching and detaching mechanism J mounted on the tip of the swingable arm G with the resiliently supporting mechanism I interposed therebetween, and an abrasive wheel tool supplying and removing mechanism K attached to the mechanism J, the abrasive wheel attaching and detaching mechanism J consisting of abrasive push-pull mechanism L and spindle clamping mechanism M. Further, the abrasive wheel suplying and removing mechanism K comprises a disc-shaped magazine N supporting tens of abrasive wheel tools on the peripheral surface thereof and a magazine indexing mechanism P for angularly indexing the magazine N.

As shown in FIG. 17, the piston 43 of the abrasive wheel push-pull mechanism L is movable in the axial direction of the spindle, axially in the cylinder 44 of the abrasive wheel push-pull mechanism L. The rod 12 extending from the cylinder 44 in the direction toward the wheel head B is provided with a cut-out portion 45 having a large width and a latching portion 5 formed at the tip of the rod 12, the latching portion 5 is formed with a groove 46 for receiving the spindle.

In the side surface of the cut-out portion 45 at the side of the piston 47 a press pin 11 is secured for urging the A. W. T. 3 onto the spindle.

A pin 49 projects from the lower surface of the cylinder 44 so as to be received with its upper end in the groove 48 provided in the lower surface of the rod 12, thereby providing a stop for preventing the rotation of the piston 43. An O-ring 50 serves not only as a seal but also serves to prevent the piston 43 from moving when no pressure is applied thereto.

Figure 18:
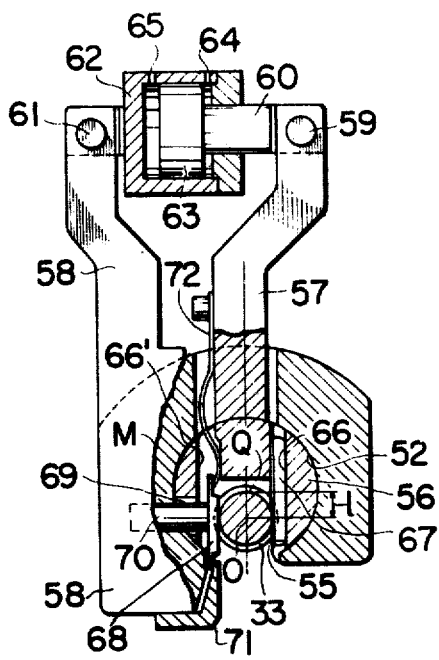
FIG. 18 is a front view showing the essential portion of the clamping mechanism of the spindle of the wheel head.
Figure 19:
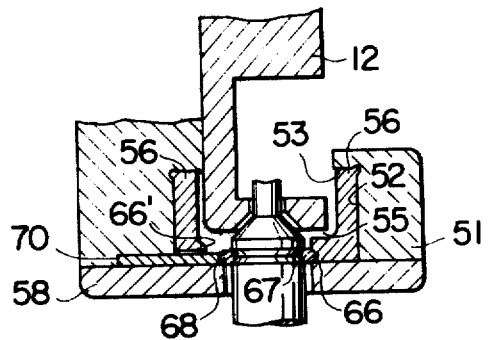
FIG. 19 is a cross-sectional view of FIG. 18 along the center thereof.
Figure 20:
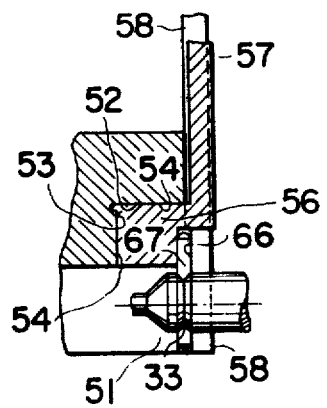
FIG. 20 is a sectional view along the center of the portion shown in FIG. 18 as seen from the right.

The spindle clamping mechanism M has the function to firmly clamp the spindle 4 between it and the tip of the cylinder 44 forming the main part of the abrasive wheel push-pull mechanism L or to release the spindle. As shown in FIGS. 18, 19, 20 an arcuate hole 54 having a peripheral journaling surface 52 having the central axis Q offset by the amount l from the central axis o of the piston rod 12 and a thrust receiving surface 53 perpendicular to the central axis Q is provided in the forward end portion 51 of the cylinder 44. A bifurcated cylindrical body 56 having a spindle receiving space 55 at its lower portion is shiftably located in the arcuate hole 54, and the clamping jaw 57 extending upwardly from the body 56 is ratatable by a small angle about the central axis Q referred to above. A portion of the front surface of the bifurcated body 56 beneath the clamping jaw 57 is held by a portion of the lower part of a stationary arm 58 so as to prevent the body 56 from being withdrawn from the hole 54. The upper end of the arm 57 is pivotably connected to the lever 60 by means of a joint 59.

The stationary arm 58 is secured integrally to the front surface of the cylinder 44 and extends upwardly, and the upper end of the arm 58 is pivotably connected to an oil pressure actuated cylinder 62 by means of a joint 61 within which the piston 63 connected to the lever 60 slides. Thus, when oil pressure is applied to the cylinder through the part 64, the joints 59, 61 are moved toward each other, so that the clamping jaw 57 is rotated in the counterclockwise direction about the central axis Q thereby moving the right side surface in the lower portion of the bifurcated body 56 apart from the opposing surface, i. e., the inner surface in the lower portion of the stationary arm 58 so as to open the clamping mechanism, whereas, when the oil pressure is applied through the part 65 to the cylinder 62, the clamping mechanism is closed.

As shown in FIG. 19, grooves 66, 66' having the same depth and being parallel to each other are formed in the opposing surfaces of the bifurcated body 56 at the front end surface thereof. Pin 67 or 68 are received in respective grooves 66, 66' and each of the pins is held by the flattened portion at the lower part of the stationary arm 58 secured to the front end of the cylinder 44.

The groove 66 has a width equal to the diameter of the pin 67 and is moved by the small angle about the central axis Q of the bifurcated body 56 together therewith. However, the groove 66' has a width greater than the diameter of the pin 68 so that the pin 68 is freely moved relative to the groove 66' therein.

A groove 69 provided in the front end surface of the cylinder 44 receives a supporting tip 70 freely shiftable therein and projecting from the groove. The lower end of the pin 68 is held by a holding tip 71 secured to the lower end of the stationary arm 58, while the upper end of the pin 68 is resiliently held by a leaf spring 72 attached to the clamping jaw 57 so as to prevent the pin 68 from moving toward the opposing pin 67. Therefore, the pin 68 will not move even though the bifurcated cylindrical body 56 is rotated by a small angle and is held stationary along the side of the cylinder 44.

As described above, the automatic abrasive wheel exchanging device H is lowered when required, and it first clamps the spindle 4. Therefore, an opening allowing the free insertion of the spindle 4 is formed in each of the front end portions of the abrasive wheel push-pull piston 47, the bifurcated cylindrical body 56 at the lower end of the clamping jaw 57, and the flattened portion at the lower end of the stationary arm 58, for opening communicating with the groove 46 for advancing the latching portion 5 formed at the front end of the rod 12 of the cylinder 44.

When the bifurcated body 56 is actuated so as to close the clamping mechanism, the pins 67, 68 are moved so as to firmly clamp the spindle 4. In order to insure the clamping action, annular encroaching groove 33 is formed in the spindle 4 in which the pins 67, 68 are received.

In the clamping action as described above, the alignment of the central axis of the spindle 4 with that of the cylinder 44 or the accuracy of the clamping position in the forward and rearward direction is not absolutely insured.

Therefore, a slight backlash may occur between the annular groove 33 of the spindle 4, pins 67, 68, and the grooves 66, 66' of the bifurcated cylindrical body 56. For example, the pin 67 will slide along the inclined surface of the annular groove 33 of the spindle 4 so that relative shifting is caused between the spindle 4 and the abrasive wheel attaching and detaching mechanism J during the clamping operation in either of the axial direction and the direction perpendicular thereto. Thus, it is necessary to prevent the faulty securing of the spindle caused thereby.

In order to absorb the slight relative displacement of the spindle to the mechanism J and to permit the smooth clamping action thereof, the abrasive wheel attaching and detaching mechanism J is secured to the arm G through the resilient supporting mechanism I. As shown in FIGS. 15 and 16, two pairs of leaf springs 73, 73 and 74, 74 are so arranged perpendicularly to each other and in upper and lower positions that, when the displacement in the direction $x - x$ is required, the pair of leaf springs 73, 73 is deformed, while the pair of leaf springs 74, 74 is deformed when the displacement in the direction z-z is required.

In the device of the present invention, however, the accuracy of the indexing operation of the linear indexing device C and rotation angle indexing device E is improved in order to achieve the accurate positioning of the arm G in its lowered position, thereby permitting the spindle 4 to be clamped in the accurate relative position. Therefore, the leaf springs 73, 74 may be made relatively weak and they may be made any appropriate configuration so that no appreciable effect is given to the main shaft 39 of the wheel head.

In the embodiment described above, the clamping mechanism M is very complicated in construction. However, the spindle and the abrasive wheel push-pull mechanism L may be clamped by providing a projection at the forward end 51 of the cylinder 44 which is engaged directly with the annular groove 33 of the spindle in the wheel head by the swinging of the arm G.

In this case, however, a higher accuracy of the parts and the operation is required in comparison with the previously described embodiment.

The abrasive wheel supplying and removing mechanism K is provided in the abrasive wheel attaching and detaching mechanism J for receiving the used abrasive wheel tool 3 withdrawn from the grinder and supplying a new abrasive wheel tool to the position at which the same is pushed onto the spindle of the grinder. This mechanism K comprises a magazine having a disk-like holder provided with a plurality of abrasive wheel tool holders in its peripheral portion, the magazine being rotated so as to bring the respective holders immediately in front of the spindle 4 by means of hydraulically operated indexing mechanism and maintain in its position.

Figure 21:
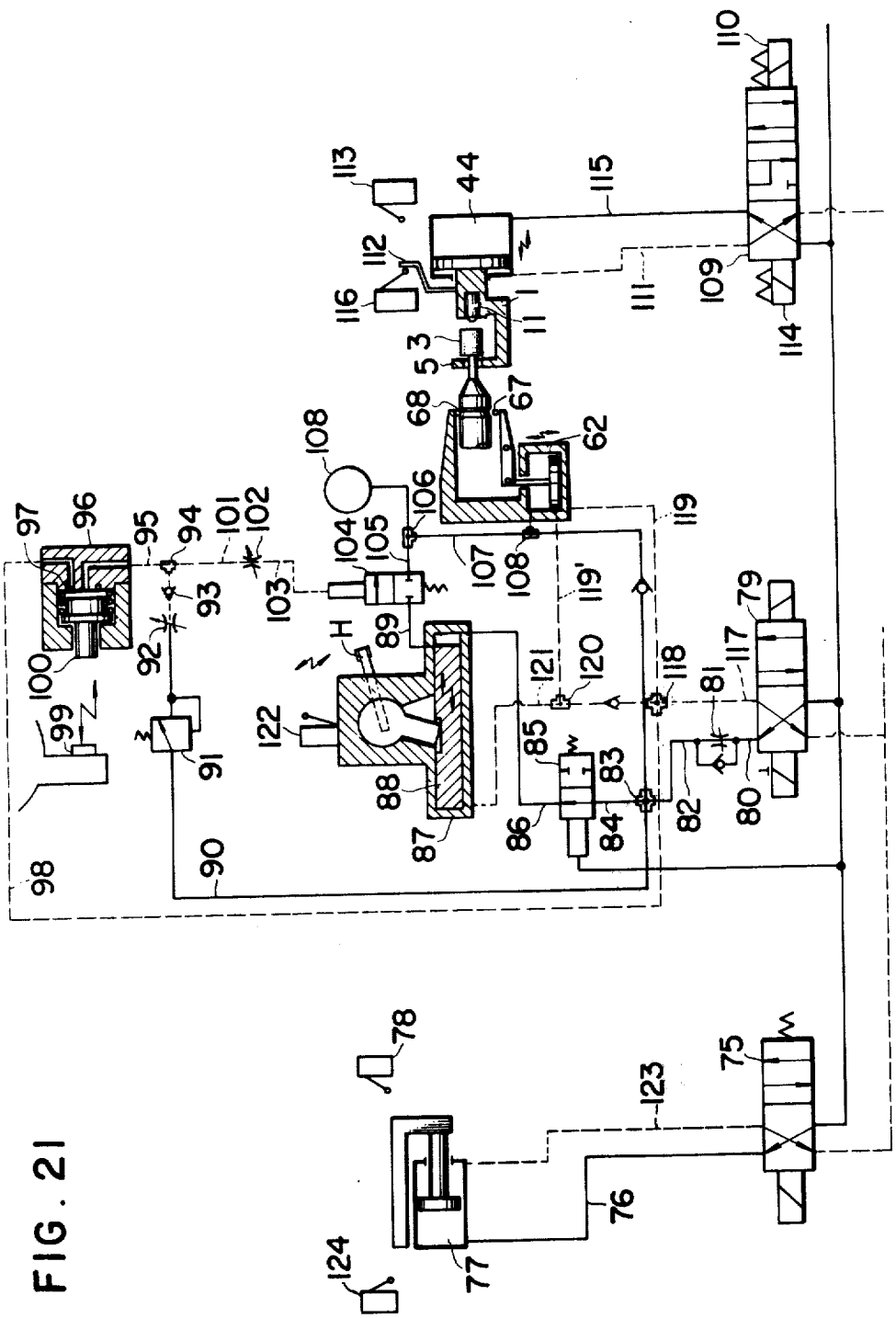
FIG. 21 is a diagram showing the operating circuit of the device of the present invention.

FIG. 21 shows the operating circuit of the device of the present invention. The operation of the present invention will be described below with reference to FIG. 21. When the abrasive wheel tool 3 has worn to the limit to wear during the operation, a limit switch (not shown) provided in the conventional feeding control device is actuated so that the table A is retracted from the working position thereof to the position for exchanging the abrasive wheel tool and the wheel head B is stopped. The signal generated when the wheel head B is stopped is utilized for commencing the automatic exchanging operation of the abrasive wheel tool, and the electromagnetically operated valve 75 for indexing the linear forward and rearward position is energized so that the pressurized oil is forced into the cylinder 77 for indexing the linear forward and rearward position through line 76 so that the changing device H as a whole is moved to the position for the rotational angle indexing which corresponds to the position of the wheel head B which has been retracted as described above, thereby permitting the limit switch 78 to generate a signal indicating that the linear indexing operation is terminated.

A switch-over electromagnetic valve 79 is then actuated by the signal indicating the termination of the linear indexing so that the pressurized oil is introduced into the rational angle indexing cylinder 87 through line 80, throttle 81, line 82, joint 83, line 84, two way switch-over valve 85 now opened, and line 86, thereby moving the indexing spool 88 to the left to swingingly lower the changing device H from the retracted higher position thereof to the position in front of the spindle 4.

As the changing device H approaches the end of its travel, pressurized oil is introduced into the line 89, while the pressured oil branched in the joint 83 is introduced into a stopper valve 96 through line 90, reducing valve 91, throttle 92, check valve 93, joint 94 and line 95, and passes through clearance 97 and line 98 so as to be exhausted.

At the end of the stroke of the changing device H, the swingable stop pin 99 urges the piston 100 of the stopper valve 96 to close the clearance 97, and, thereafter, it is stopped. Then, the draining of the oil is ceased so that the pressure of the oil in line 101 is raised. The pressurized oil is lead through throttle 102 and line 103 to two-way change-over valve 104 so as to actuate the same. In the manner described above, the pressurized oil lead to line 89 flows through the two-way change-over valve 104 which has been opened at the completion of the rotation angle indexing, and passes through line 105, joint 106, line 107, joint 108 having a pressure switch to the cylinder 62 for clamping the spindle, so that the spindle is clamped.

Upon completion of the clamping of the spindle, the pressure of the oil in line 107 rises so that the pressure switch of the joint 108 is actuated so as to generate the termination of the clamping of the spindle. At this time, the A. W. T. 3 is ready for being withdrawn by means of the latching portion 5 at the tip of the U-shaped rod 12 of the piston 43 as shown in FIG. 17. The solenoid 110 of the four-way changeover valve 109 is excited by the signal of completion of clamping the spindle so that the pressurized oil is introduced into the abrasive wheel push-pull cylinder 44 through line 111 thereby permitting the A. W. T. 3 to be shifted together with the piston 43, the A. W. T. being withdrawn by the latching portion 5 of the rod 12 forming an abrasive wheel removing tool. At this time, a cam 112 affixed to the piston 43 is brought to contact with a limit switch 113 so that a signal is generated to indicate the termination of the withdrawal of the A. W. T. The thus withdrawn A. W. T. 3 is received by the magazine of the abrasive wheel supplying and removing mechanism K which has been moved immediately in front of the spindle 4 as described previously.

By the signal indicating the termination of the removal of the A. W. T., the solenoid 110 is deenergized to switch the electromagnetic valve 109 to its neutral position.

When the magazine of the abrasive wheel supply and removing mechanism K is automatically indexed to move new A. W. T. to a position immediately in front of the spindle 4, the solenoid 114 of the electromagnetic valve 109 is energized so that the pressurized oil is introduced into the abrasive wheel push-pull cylinder 44 through line 115 thereby advancing the piston 43 again to allow the press pin 11 to urge the new A. W. T. 3 onto the spindle 4. By this action, the limit switch 116 generates a signal which actuates the electromagnetic valve 79 so as to introduce the pressurized oil into the abrasive wheel clamping cylinder 62 through line 117, joint 118 and line 119. Thus, the spindle 4 is released from the clamped state. When the spindle 4 is unclamped, the pressurized oil in the cylinder 62 is lead into the line 119' and is introduced into the rotational angle indexing cylinder 87 through joint 120, line 121 so that the piston 88 is moved to the right so as to swing the device H upwardly. At the end of the stroke of the device H, the limit switch 112 is actuated to generate a signal indicating the termination of the upward movement of the device H.

On the other hand, the pressurized oil branched from the joint 118 is introduced into the stopper valve 96 through the line 98. When the stop pin 99 is moved apart from the device H by the upward swinging of the device H, the pressurized oil lead to the line 98 reaches the two-way change-over valve 104 through the clearance 97, line 95, joint 94, line 101, throttle 102 and line 103 so as to actuate the same to stop the flow of the pressurized oil.

By the signal generated by the closure of the limit switch 112 which indicates the termination of the upward swinging of the device H, the electromagnetic valve 75 is actuated so that the pressurized oil enters the linear position indexing cylinder 77 through the line 123 thereby retracting the piston therein to close the limit switch 124 for generating a signal indicating the termination of the automatic exchanging operation of the A. W. T.

As described above, the device of the present invention makes it possible to positively and accurately clamp and release the spindle by the provision of the spindle clamping mechanism which is accurate and forcible in operation, and it is further provided with the abrasive wheel attaching and detaching mechanism co-operating with the abrasive wheel supplying and removing mechanism. Since these mechanisms are mounted on the indexing arm by the interposition of the resilient supporting mechanism, it is possible to obtain a great force sufficient to exactly attach and detach the A. W. T., while no thrust pressure is transmitted to the wheel head through the spindle during the exchanging operation of the A. W. T., thereby affording the device a long durability. Thus, the present invention greatly improves the working efficiency of the production internal grinder using the A. W. T. having a relatively small diameter.

Figure 22:
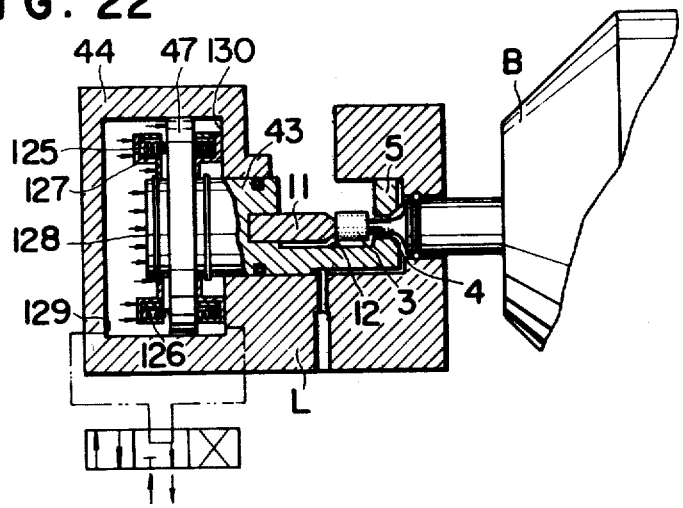
FIG. 22 is a longitudinal sectional view showing another embodiment of the abrasive wheel tool push-pull mechanism.

Another embodiment of the abrasive wheel push-pull cylinder 44 will be described below with reference to FIG. 22 illustrating the same.

As described above, the abrasive wheel push-pull cylinder 44 has U-shaped piston rod 12 provided with the press pin 11 and the latching portion 5 for attaching and detaching the A. W. T. 3. While the A. W. T. is withdrawn or force-fitted with the spindle, the opposing inner end surfaces of the rod 12, i.e., the latching portion 5 and the press pin 11 and directly brought in contact with the cylindrical tubular bushing 2 of the A. W. T. 3 so as to apply the force to the bushing. Therefore, there is the danger that the abrasive wheel push-pull mechanism might contact or collide with the A. W. T. when the mechanism is returned to its initial position by releasing the same or again advanced while clamping the A. W. T.

Since the width of the space within the U-shaped engaging and disengaging tool 12 is slightly larger than the width of the abrasive wheel tool 3 as described previously, it is necessary to provide clearance between the tool 12 and the A. W. T. 3 each time the attachment or the detachment of the A. W. T. is completed.

In the embodiment shown, a push-back resilient mechanism is provided in either of the side surfaces of the piston 47.

The push-back resilient mechanism is of the construction utilizing the resilient force of coil springs. To this end, a spring cage 126 having a plurality of coil springs 125 located in its peripheral portion is positioned at each side of the piston 47 and the ends of the springs in each cage are held by a spring sheet 127 and a snap ring 128 holds the spring sheet 127 so that the resilient force of the springs 125 is applied to the sides of the piston 47 with a small clearance given so as to allow the piston to move therein.

Therefore, when the pressurized oil is introduced into the part 129 so as to advance the piston 47 as shown in FIG. 22, so that the A. W. T. 3 is force-fitted onto the spindle 4 by means of the press pin 11, and then the push-pull resilient mechanism moves between the end surface 130 of the cylinder 44 and the piston 47 to stop the latter at its extreme position of the stroke, the supply of the pressure oil ceases to release the urging of the piston 47, therefore, the coil springs 125 which have been compressed are operative to move back the piston 47 a small distance by their resilient force. The result is that the press pin 11 is retracted a small distance to be moved apart from the contact with the A. W. T. 3. The above action of the springs 125 applies when the piston 47 is moved back its entire stroke to withdraw the A. W. T. 3 from the spindle 4 by means of the inner end surface at the tip of the U-shaped attaching and detaching tool 12.

As described above, the embodiment effects not only the reciprocal movement, but also allows the contacting surfaces of the operating elements to be moved apart from each other a predetermined small distance each time the required operation has been completed so as to be held in its rest position.

Figure 23:
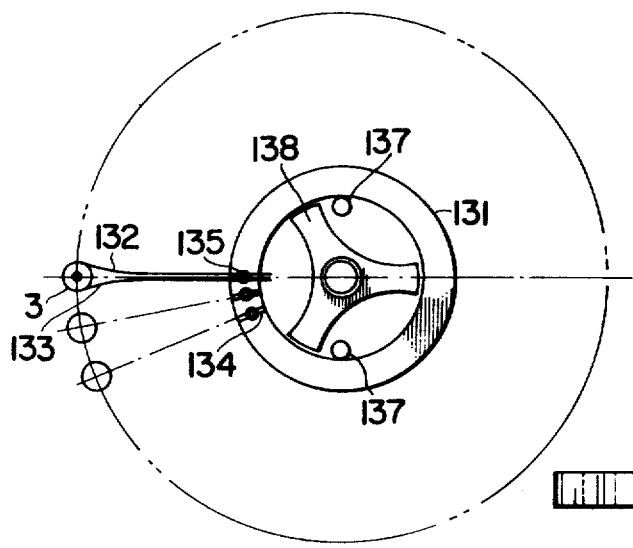
FIG. 23 is a front view showing an embodiment of an abrasive wheel holding magazine with a portion thereof being omitted for the clear showing.
Figure 24:
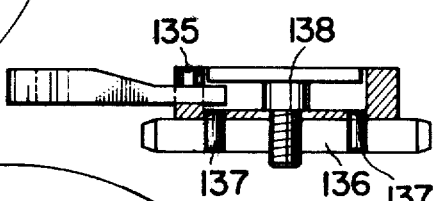
FIG. 24 is a longitudinal sectional view of the embodiment of FIG. 23 along the center thereof.

FIGS. 23 and 24 show an embodiment of the abrasive wheel supplying and removing mechanism N, i.e., the magazine.

The magazine comprises a disc-like leaf holder 131 on which tens of pairs of leaf springs 132, 133 are affixed. Each pair of opposing leaf springs 132, 133 are fitted in the respective cut-off radial groove 134 provided in the leaf holder 131 and affixed thereto by means of the set screw 135. The tip of each of the opposing leaf springs 132, 133 is rounded in the semi-circular form so as to be adapted to clamp the A. W. T. 3 between the rounded tips of the leaf springs 132, 133.

The leaf holder 131 is positioned with respect to the indexing plate 136 by means of pins 137, 137 and detachably secured thereto by a mounting nut 138.

Figure 25:
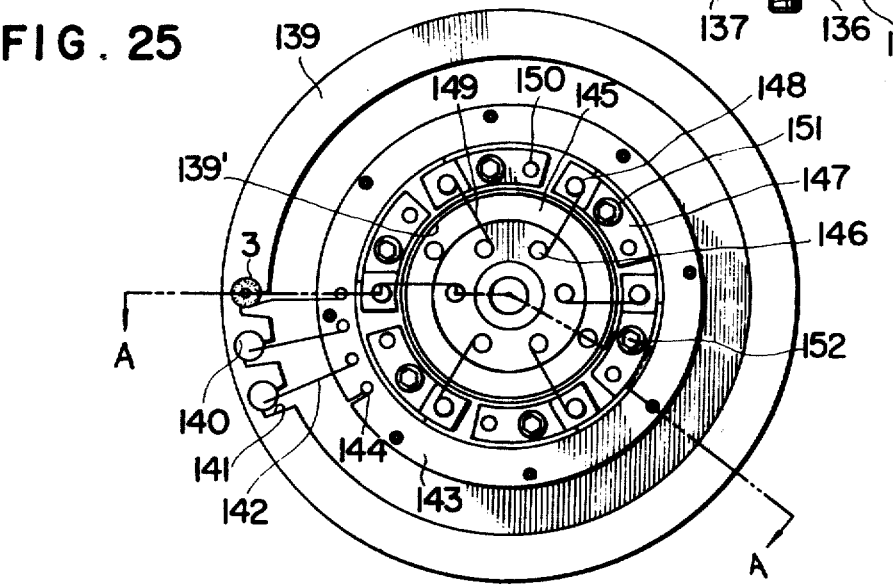
FIG. 25 is a front view showing another embodiment of the abrasive wheel tool holding magazine with a portion thereof being omitted.
Figure 26:
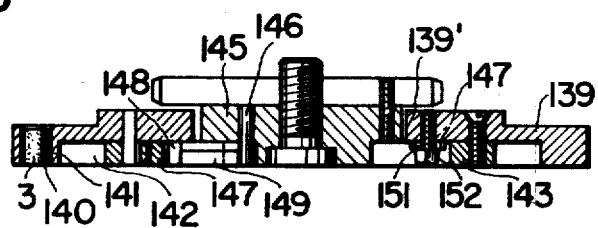
FIG. 26 is a sectional view of the magazine of FIG. 25 along lines A—A in FIG. 25.

Another embodiment of the magazine is shown in FIGS. 25, 26. The magazine shown is adapted to elastically support the A. W. T. 3 between a single leaf spring and the wall of the loading hole formed in the disc. The disc is connected to a center disc by means of a spring plate rotatable forwardly and reversely with respect to the center disc. In other words, tens of abrasive wheel loading holes 140 are formed along the outer peripheral edge of the cage portion 139, and spring receiving cut-off portions 141 communicating respectively with the holes 140 are provided. The tip of the leaf spring 142 is located in each of the cut-off portions 141 so as to hold the side of the A. W. T. 3 while the proximal end of the leaf spring 142 is press-fitted in the securing groove 144 formed in the leaf spring holder ring 143 which is secured to the flattened interior surface of the cage 319.

A magazine disc 145 is provided coaxially with the cage 139 so that the inner peripheral surface 139' of the cage 139 will not contact with the magazine disc 145. A number of upstanding pins 146 are secured to the disc 145 while the same number of adjusting pieces 147 are provided in the cage 139 at the side interior of the inner peripheral surface thereof. A pin 148 is secured to each of the adjusting pieces 147 so as to extend therefrom and a bridging leaf 149 is bridged between the pin 146 and the pin 148 so that the magazine disc 145 is resiliently movable in either of the forward and reverse directions relative to the cage 139 by a small angle. The adjusting piece 147 is supported by a pin 150, and the position of the adjusting piece 147 is adjusted by the setting bolt 152 engaged in the elongated hole 151, so that the tension of the bridging leaf 149 is made adjustable.

Figure 27:
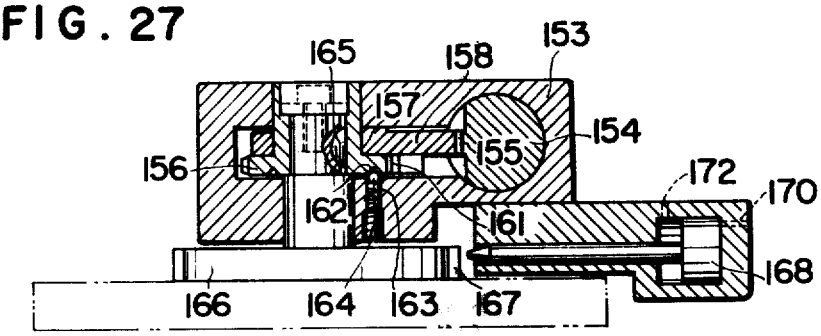
FIG. 27 is a cross-sectional view showing the essential portion of a magazine indexing mechanism.
Figure 28:
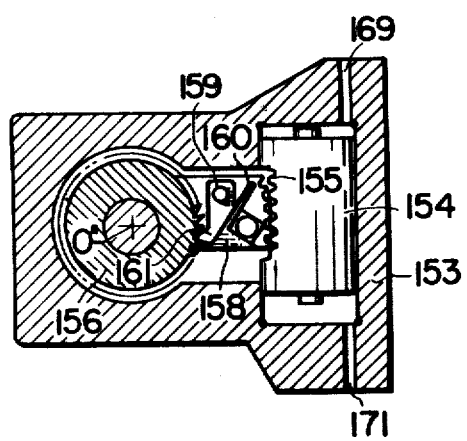
FIG. 28 is a longitudinal sectional view of the portion shown in FIG. 27.

An embodiment of the magazine indexing mechanism for rotating successively the abrasive wheel holding magazine to the required position and holding it in its rotated position will be described below with reference to FIGS. 27, 28. In the embodiment shown, cylinder 153 has an indexing spool 154 reciprocal therein by the action of the pressurized oil. A rack 155 is formed in the side surface of the spool 154, with which a reciprocally swingable pinion 158 pivotable about the axis O" is engaged. The pinion 158 is supported by the journaling portion 157 of the ratchet wheel 156 located coaxially with the pinion 158. A ratchet pawl 161 is pivotable supported by a pin 159 secured to the pinion 158 and the pawl 161 engages with the teeth of the ratchet wheel 156. A leaf spring 160 secured to the pinion 158 urges the pawl 161 against the teeth of the ratchet wheel 156 is intermittently rotated by the actuation of the spool 154. In order to accurately position the ratchet wheel 156 each time it is rotated, a plurality of holes 162 are formed circumferentially in the side surface of the ratchet wheel 156 into selected one of which a stopper ball 164 slidably located in the cylinder 153 and urged toward the ratchet wheel 156 by the coil spring 163 is checkingly fitted.

The accuracy of the position at which the magazine is stopped is very important, because the A. W. T. must be accurately aligned with the spindle when the exchanging operation is effected. Therefore, a hydraulically actuated notch piston 168 is provided so as to appropriately engage with the teeth 167 of the indexing plate 166 secured to the ratchet wheel 156 by key 165 so as to accurately position the same. In FIG. 28, when pressurized oil is introduced through the port 169, the indexing spool 154 is shifted to feed by one tooth the ratchet wheel 156 and the indexing plate 166 through the rack 155, swingable pinion 158 and the pawl 161. At this time, the stopper ball 164 accurately positions the indexed position while the notch piston 168 is simultaneously actuated hydraulically to positively hold the indexing plate 166 in its accurately indexed position by the pressurized oil from the port 170.

Although the alignment of the A. W. T. with the spindle can not be absolutely strictly set in the manner stated above, the provision of the leaf springs 132, 133, the bridging leaf 149 resiliently accommodate the attaching and detaching action when the abrasive wheel attaching and detaching mechanism is actuated.

After the operation of the attaching and detaching mechanism is terminated, the pressurized oil is fed to the port 171 so that the pawl 161 is moved back over the teeth of the ratchet wheel 156 so as to position the same to engage with the tooth for the succeeding operation, while the notch piston 168 is retracted by introducing the pressurized oil to the port 172.

As described above, the device of the present invention makes it possible to automatically exchange tens of A. W. T. by a single exchange of the magazine, the A. W. T. having been exchanged one by one manually in the prior art. The magazine can be accurately positioned relative to the axis of the attaching and detaching mechanism which is reciprocally moved, and the A. W. T. resiliently held in the magazine can be rapidly guided without fail with the force sufficiently insuring the positive operation of the device.

What is claimed is:

1. In an internal grinding machine including an abrasive wheel tool having a cylindrical tubular abrasive wheel and a cylindrical tubular bushing securely fixed to the bore of said abrasive wheel, a wheel head and a cylindrical spindle extending along an axis from said wheel head, the improvement wherein: said cylindrical spindle includes a leading end connecting portion having a diameter slightly larger than the internal diameter of said tubular bushing and wherein said abrasive wheel tool is detachably secured fixedly to said spindle by being press-fitted onto said end portion with the leading edge of cylindrical spindle end portion cutting into said bushing and expanding the bushing to form a burnishing connection due to the interference fit formed therebetween, and wherein said grinding machine further comprises means for removing and discarding the abrasive wheel tool mounted on said spindle and means for placing a new abrasive wheel tool on said spindle by the relative movement of the wheel with respect to said wheel head spindle along said axis, said abrasive wheel tool removing and discarding means comprising a U-shaped member being supported on a base movable parallel to said spindle, said wheel tool being mounted on said member and being movable transversely with respect to said spindle, said member having right angle wall portions on opposite sides of said wheel tool with one of said wall portions being slotted to permit said spindle to extend therethrough from said wheel head and a press pin carried by said other wall and extending outwardly therefrom towards said spindle and said wheel tool and axially aligned therewith, and means for reciprocating said U-shaped member in one direction along said axis to cause said slotted wall to press on one end of said wheel tool to remove said wheel tool axially from said spindle, and movable in the other direction along said axis to cause said press pin to press a new wheel tool onto the end portion of said cylindrical spindle.

2. The internal grinding machine according to claim 1, wherein said cylindrical tubular bushing is made of a material such as a soft metal and a plastic.

3. The internal grinding machine according to claim 1, wherein said cylindrical spindle is formed with spline-shaped longitudinal grooves for enhancing the firm engagement of said bushing with said cylindrical spindle.

4. The internal grinding machine according to claim 1, wherein said cylindrical spindle is formed with broach-like annular grooves for enhancing the firm engagement of said bushing with said cylindrical spindle.

5. The internal grinding machine according to claim 1, wherein said cylindrical tubular bushing has projecting portions extending axially from the respective ends of the abrasive wheel for engaging a push-pull tool of the grinding machine so as not to destroy the abrasive wheel per se when the abrasive wheel tool is press-fitted onto or withdrawn from said spindle by the operation of said tool.

6. The internal grinding machine according to claim 5, wherein one of said projecting portions of said bushing is in the form of a flange extending radially from one end of said abrasive wheel and having the outer diameter smaller than that of said abrasive wheel per se.

7. The internal grinding machine according to claim 1, wherein the inner peripheral surface of said cylindrical tubular bushing is formed in a taper in which the inner diameter of one end portion thereof corresponding to the tip portion of said spindle when said spindle is press-fitted into said bushing is smaller than the outer diameter of said tip portion of said spindle.

8. The internal grinding machine according to claim 1, wherein said cylindrical tubular bushing has stepped inner diameter portions and said spindle is correspondingly stepped.

9. The internal grinding machine according to claim 8, wherein said cylindrical spindle comprises a forward reduced diameter portion and a rearward enlarged diameter portion and said bushing comprises correspondingly forward reduced and rearward enlarged internal diameter portions.

10. The internal grinding machine according to claim 1, further comprising clamp means for chucking said spindle while said U-shaped member operates to remove an abrasive wheel tool from said spindle and place a new one thereon, and wherein said clamp means is carried by said U-shaped member.

11. The internal grinding machine according to claim 10, wherein said abrasive wheel tool removing and discarding means is elastically mounted to said internal grinding machine to take up play of the components forming the same.

12. The internal grinding machine according to claim 10, wherein a pressurized oil hydraulically operated cylinder and a piston movable therein, is operatively coupled to said U-shaped member, and said piston is provided with spring means for retracting said piston a small distance from a given position thereof when actuated by the pressurized oil, when the pressure of the oil is released said press pin being mounted on said piston.

13. The internal grinding machine according to claim 1, further comprising an abrasive wheel tool supplying means for storing therein a plurality of abrasive wheel tools and means for supplying one by one, said abrasive wheel tools onto said spindle when the abrasive wheel tool is exchanged.

14. The internal grinding machine according to claim 13, wherein said abrasive wheel tool supplying means is in the form of a disc and is provided with a plurality of holes arranged radially of said disc each adapted to hold respectively one of the plurality of said abrasive wheel tools and a spring for each hole for urging the abrasive wheel tool therein to the side of said hole so as to prevent the inadvertent removal of an abrasive wheel tool therefrom.

15. The internal grinding machine according to claim 14, wherein said abrasive wheel tool supplying means comprises a disc in the form of a doughnut provided with said plurality of holes for holding the abrasive wheel tools, another disc of a smaller diameter located in the space defined by the inner diameter of said doughnut-shaped disc and second spring means for elastically connecting said doughnut-shaped disc to said disc of the smaller diameter.

* * * * *